United States Patent
Bruford et al.

(10) Patent No.: US 7,229,116 B1
(45) Date of Patent: Jun. 12, 2007

(54) LOCK ROD SUPPORTS STOWED IN D-PILLAR OF VEHICLE

(75) Inventors: Steve Bruford, West Bloomfield, MI (US); Kian-Huat Tan, Westland, MI (US); Herbert Gruber, Rochester Hills, MI (US); Rudy Gruber, Uxbridge (CA)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 11/235,914

(22) Filed: Sep. 27, 2005

Related U.S. Application Data

(63) Continuation-in-part of application No. 10/969,262, filed on Oct. 20, 2004, now Pat. No. 6,966,595.

(60) Provisional application No. 60/515,521, filed on Oct. 29, 2003, provisional application No. 60/515,370, filed on Oct. 29, 2003.

(51) Int. Cl.
*B62D 25/00* (2006.01)

(52) U.S. Cl. .................. 296/57.1; 296/26.08

(58) Field of Classification Search ............ 296/26.08, 296/26.09, 26.1, 26.11, 57.1; 224/402, 403, 224/405
See application file for complete search history.

(56) References Cited

U.S. PATENT DOCUMENTS

| | | | |
|---|---|---|---|
| 6,045,172 A * | 4/2000 | Thomas et al. | 296/26.1 |
| 6,364,392 B1 * | 4/2002 | Meinke | 296/62 |
| 6,454,338 B1 * | 9/2002 | Glickman et al. | 296/57.1 |
| 6,983,972 B2 * | 1/2006 | Tan et al. | 296/57.1 |

* cited by examiner

*Primary Examiner*—Joseph D. Pape
(74) *Attorney, Agent, or Firm*—Gigette Bejin; Miller Law Group, PLLC

(57) ABSTRACT

A lock rod support member can be stowed within a support tube housed in the body of the pick-up truck on which a supplemental tailgate assembly to be deployable from the tailgate structure of the pick-up truck. The support tube for the lock rod can be mounted internally of the D-pillar of the pick-up truck body with the lock rod extendible therefrom, or mounted beneath the top rail of the pick-up truck bed from which the lock rod can be extended, for engagement with the deployed supplemental tailgate assembly. A stop bracket positioned at the end of the lock rod support tube engages and positions the formed distal end of the lock rod for appropriate positioning for engagement with the supplemental tailgate assembly. A spring latch mechanism is mounted on the opposing ends of the supplemental tailgate structure for clasping the insertion end of the lock rod members.

19 Claims, 9 Drawing Sheets

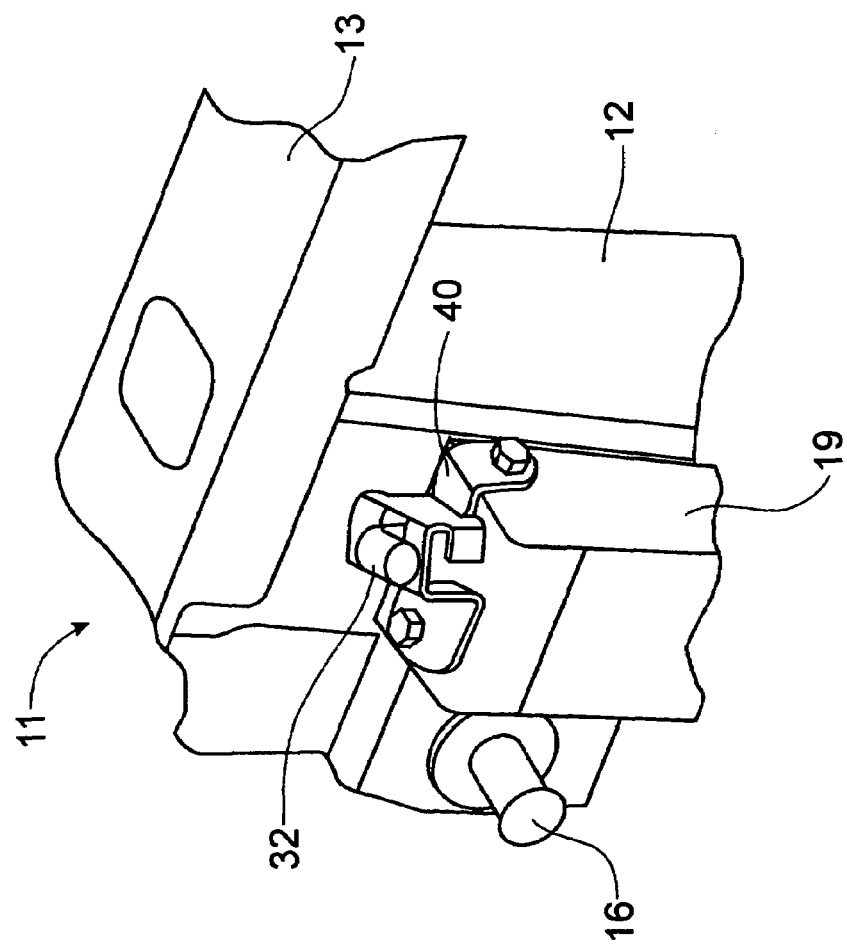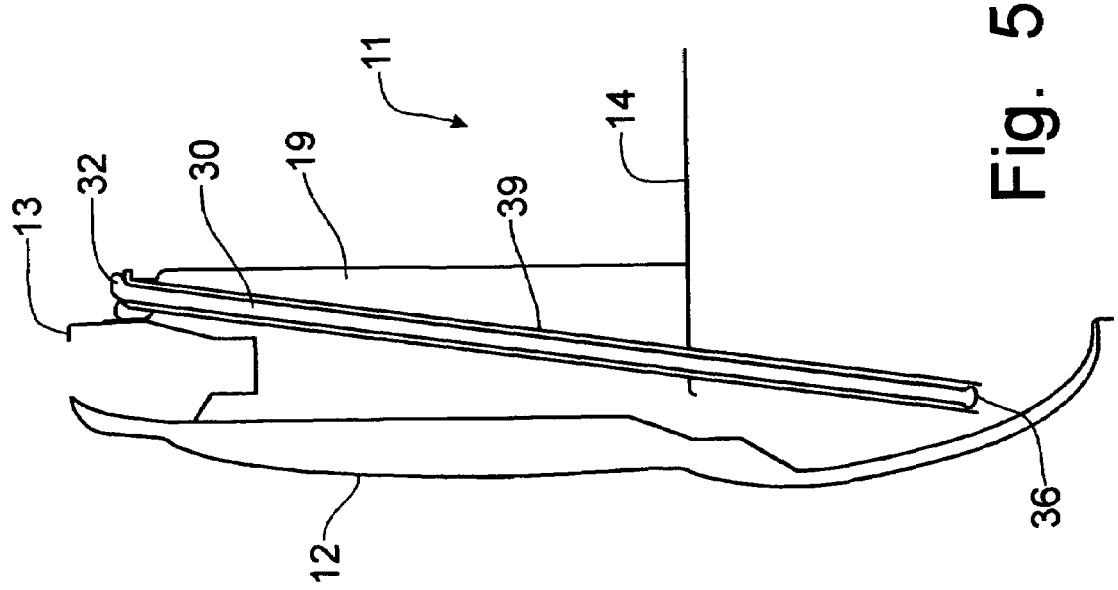

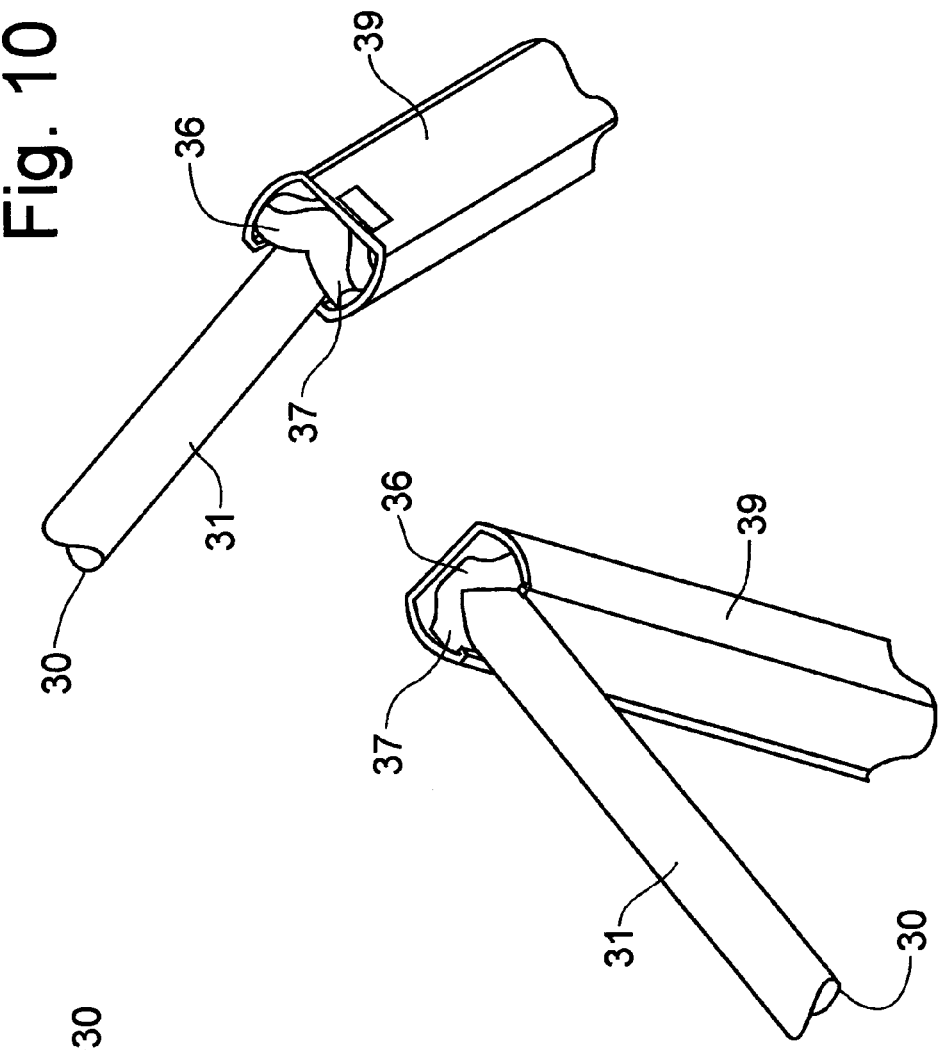

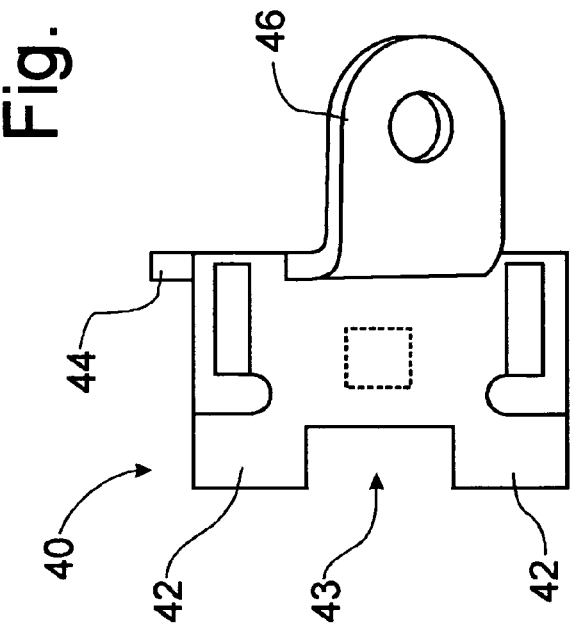
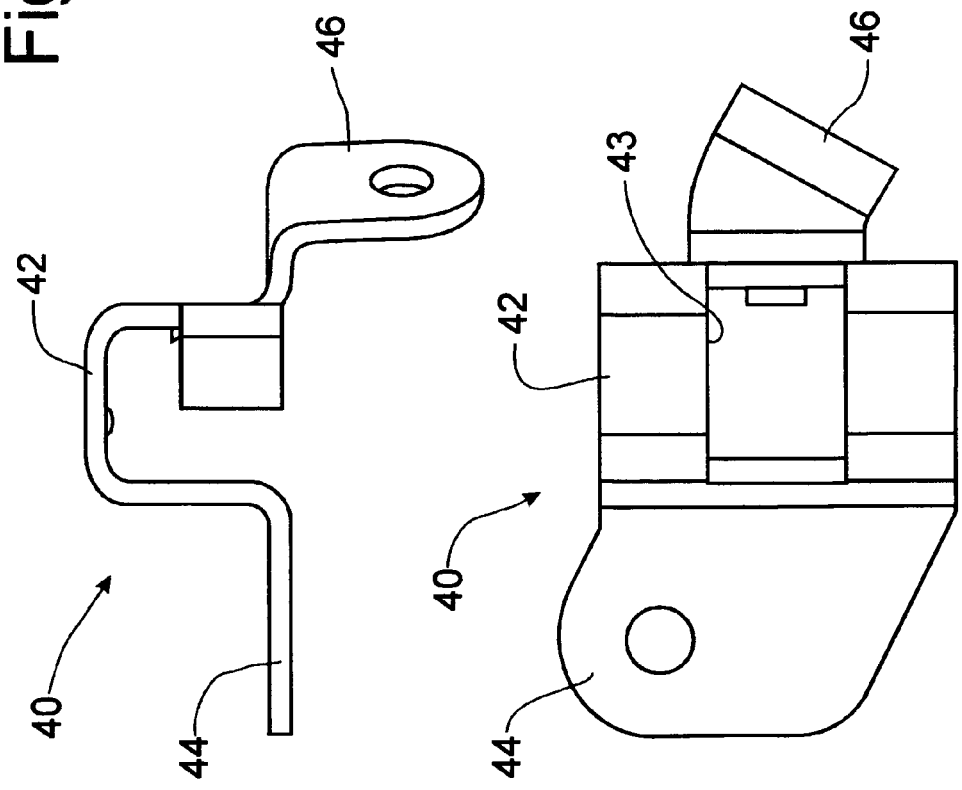

LOCK ROD SUPPORTS STOWED IN D-PILLAR OF VEHICLE

CROSS-REFERENCE TO RELATED APPLICATIONS

This application is a continuation-in-part of U.S. patent application Ser. No. 10/969,262 U.S. Pat. No. 6,966,595, filed on Oct. 20, 2004, which claims domestic priority on U.S. Provisional Patent Application Ser. No. 60/515,521, filed Oct. 29, 2003 and Application No. 60/515,370 filed Oct. 29, 2003, all of which are incorporated herein by reference.

FIELD OF THE INVENTION

The present invention relates to vehicle tailgates, and, more particularly, to tailgates for use on pickup trucks and having a supplemental tailgate assembly that is extendable therefrom

BACKGROUND OF THE INVENTION

Conventionally, pickup trucks include a tailgate at the back of a bed that closes off a cargo box. Often times, the truck bed is not long enough to hold the cargo, so truck bed extenders have been developed. The truck bed extenders work in conjunction with the open tailgate in order to provide additional length to the bed. Some of the bed extenders mount to the outside of the tailgate or to the box itself, which may be convenient for deployment, but they tend to interfere with cargo space in the box since the bed extender, when not in use, protrudes into the box. Moreover, it is typical for the vehicle operator to employ the extender only occasionally, so it is generally undesirable to have the extender exposed at all times, which detracts from the attractiveness of the vehicle.

Additionally, it is sometimes desirable to have an extender that can provide other functions in addition to a bed extender, such as a box extender function—an upwardly extending structure from the rearmost edge of an open tailgate that mimics the function of a closed tailgate. Such arrangements are particularly useful for carrying a load that is longer than the bed, but needs rearward support like a closed tailgate provides in order to prevent the load from falling backwards off the truck. Again, though, typical box extenders that provide adequate functionality are externally mounted and not only detract from the vehicle appearance when not in use but also require changes to the box for mounting such extenders. Also, most of these types of extenders are very cumbersome to deploy and later stow away, thus being undesirable for the operator to use. Such functions may be provided with simple ergonomic operation of the assembly, while still allowing for an attractive appearance for the vehicle when the extender is stowed during periods of non-use. Thus, while the exterior mounted extenders may be able to perform multiple functions, they still suffer from the drawbacks of an unattractive appearance and taking up room in the bed even when not in use.

Another drawback with common bed extenders is that a desirable feature of conventional tailgates may be lost. That is, a conventional tailgate has an ornamental plastic tailgate molding mounted along its top surface. It is meant to provide a surface along which cargo can be slid into the bed without the concern of rusting due to paint being scraped off. Some bed extender designs interfere with or cause the elimination of this molding, further detracting from the appearance of the vehicle.

Positioning the extended supplemental tailgate structure generally perpendicularly to the plane of the mail tailgate structure, while the main tailgate structure is moved to an open position such that the plane of the tailgate structure is substantially parallel to the bed of the pickup truck, places the extended supplemental tailgate structure in an orientation that is substantially parallel to the main tailgate structure when the main tailgate structure is in a normal closed position. In such an extended position, the supplemental tailgate can provide a restriction to the rearward movement of objects located on the bed of the pickup truck. Furthermore, such an extended position of the supplemental tailgate can provide support for objects placed on top of the supplemental tailgate. The extended supplemental tailgate, however, has a limited support structure on the main tailgate and would have enhanced stability if support members were provided to extend between the extended supplemental tailgate and the body of the pickup truck.

Thus, it is desirable to have a vehicle tailgate with a bed extender that overcomes the drawbacks of the prior art, and particularly is provided with support members interconnecting the bed extender structure and the body of the pickup truck.

Storage of the support members when not in use interconnecting the body of the pick-up truck and the bed extender structure should position the support members at a location that can be accessed conveniently for deployment, but stowed out of the way of the otherwise normal operative function of the bed of the pick-up truck to haul cargo. The support members can be housed in the bed extender structure, but such storage of the support members requires storage space within the bed extender structure, which is an apparatus that has limited spatial availability as the bed extender structure itself should be stored in an inoperative position within the confines of the interior of the tailgate of the pick-up truck.

Accordingly, it would be desirable to provide for the storage of the support members on the body of the pick-up truck, instead of within the bed extender structure.

SUMMARY OF THE INVENTION

In its embodiments, the present invention contemplates a tailgate assembly for use with a motor vehicle having a pair of spaced, generally vertical side walls and a generally horizontal bed extending therebetween. The tailgate assembly has a tailgate frame, including a rear panel and a front panel, adapted to pivotally mount generally between the side walls and being operable in a generally horizontal open position. The tailgate assembly also may have a supplemental tailgate including a guide system secured generally between the rear panel and the front panel, a movable frame assembly having two telescoping supports extendable from, pivotable relative to and retained by the guide system, and a cross member connected to the two telescoping supports and extending therebetween and including a first end and an opposed second end. The supplemental tailgate is stabilized by a lock rod assembly that is housed in the body of the pick-up truck for convenient deployment to interconnect the pick-up truck body and the supplemental tailgate structure.

An embodiment of the present invention also contemplates a supplemental tailgate assembly for use with a vehicle tailgate having a tailgate frame forming a generally hollow cavity therein. The supplemental tailgate assembly includes a guide system adapted to be secured generally within the hollow cavity of the tailgate, and a movable frame assembly having two telescoping supports extendable from and retained by the guide system, a cross member connected to the two telescoping supports and extending generally therebetween and including a first end and an opposed second end. The lock rod assembly is preferably mounted in the D-pillar of the pick-up truck body within a guide tube mounted internally of the D-pillar to be extendable therefrom for positioning into engagement with the supplemental tailgate.

An advantage of an embodiment of the present invention is that the lock rod assembly is easily accessible at the D-pillar of the pick-up truck frame for positioning into engagement with the supplemental tailgate to provide positional stability for the supplemental tailgate.

Another advantage of an embodiment of the present invention is that neither the supplemental tailgate nor the lock rods, when in their respective retracted positions during times of nonuse, will detract from the aesthetic attractiveness of the vehicle. Moreover, it can closely match the look of tailgates for similar trucks that do not have a supplemental tailgate, thus allowing for essentially the same appearance across that particular line of trucks.

An additional advantage of an embodiment of the present invention is that the highly ergonomic and esthetically pleasing supplemental tailgate assembly still allows for a multi-function bed extender. This supplemental tailgate assembly may be moved to different positions in order to be employed to extend the bed, extend the box, and operate as an assist step.

It is an advantage of this invention that the supplemental tailgate supports provide support against a loading on the supplemental tailgate that would urge the supplemental tailgate rearwardly and distribute the fore-and-aft loads into the D-pillar away from the tailgate pivot bracket.

It is an advantage of this invention that the deployment of support members interconnecting the supplemental tailgate and the pickup truck body is facilitated.

It is another advantage of this invention that the storage of the support members is provided to retract the support members from view when not deployed, yet permit the support members to be easily accessed for deployment as needed.

Accordingly, it is an object of the present invention to provide storage for support members, which are operative to interconnect the pick-up truck body and a supplemental tailgate assembly, within the body of the pick-up truck, instead of within the confines of the supplemental tailgate assembly.

It is a feature of this invention that in one embodiment the support rods are housed within a support tube mounted internally of the D-pillar of the pick-up truck body.

It is another feature of this invention that a stop bracket is mounted on the top surface of the D-pillar of the pick-up truck to engage the formed distal end of the lock rod member when retracted from the D-pillar.

It is another advantage of this invention that the stop bracket positions the lock rod members at the proper position for engagement with the supplemental tailgate assembly when positioned in the upright orientation.

It is a further feature of this invention that locating the storage position of the lock rods in a place other than in the main tailgate reduces the mass of the main tailgate.

It is a further advantage of this invention that the reduction of the mass of the main tailgate structure reduces the effort required to open and close the main tailgate.

In another embodiment of this invention, the lock rod assembly is housed within a support tube that is mounted beneath the top rail of the pick-up cargo bed.

It is an advantage of this embodiment that the lock rod assembly can be easily deployed without requiring vertical height above the bed of the pick-up truck to deploy the lock rod members.

It is another object of this invention to provide a lock rod assembly that will deploy from the bed of the pick-up truck to extend rearwardly therefrom for engagement with the supplemental tailgate structure positioned vertically from an opened tailgate.

It is still another object of this invention to provide a latching mechanism for utilization with a lock rod member deployed from the body of the pick-up truck.

It is yet another feature of this invention that the latching mechanism can be mounted on the opposing ends of the supplemental tailgate structure for engagement with the corresponding lock rod member.

It is yet another advantage of this invention that the latching mechanism utilizes a pivoted lever to open and release a spring latch engagable with the insertion end of the lock rod support member.

It is a further object of this invention to provide easily deployed lock rod support members interconnecting a supplemental tailgate structure and the body of a pickup truck to enhance the operative stability of the supplemental tailgate structure that is durable in construction, inexpensive of manufacture, carefree of maintenance, facile in assemblage, and simple and effective in use.

These and other objects, features and advantages are accomplished according to the instant invention by providing a lock rod support member that can be stowed within a support tube housed in the body of the pick-up truck on which a supplemental tailgate assembly is deployable from the tailgate structure of the pick-up truck. The support tube for the lock rod can be mounted internally of the D-pillar of the pick-up truck body with the lock rod extendible therefrom, or mounted beneath the top rail of the pick-up truck bed from which the lock rod can be extended, for engagement with the deployed supplemental tailgate assembly. A stop bracket positioned at the end of the lock rod support tube engages and positions the formed distal end of the lock rod for appropriate positioning for engagement with the supplemental tailgate assembly. A spring latch mechanism is mounted on the opposing ends of the supplemental tailgate structure for clasping the insertion end of the lock rod members.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is an enlarged partial perspective view of the top portion of the D-pillar having the lock rod stowed therein, the stop bracket being depicted on the top surface of the D-pillar;

FIG. 5 is a partial cross-sectional view taken through the D-pillar to depict a rear elevational view of the support tube and lock rod stowed therein as mounted within the D-pillar;

FIG. 8 is a plan view of the lock rod member formed in accordance with the principles of the instant invention, the central portion of the lock rod member being broken away for purposes of clarity;

FIG. 9 is a partial upper rear schematic perspective view of the lock rod and support tube;

FIG. 10 is a partial upper front schematic perspective view of the lock rod and support tube depicted in FIG. 9;

FIG. 15 is a top plan view of the stop bracket mounted on the top surface of the D-pillar in accordance with the present invention;

FIG. 16 is a side elevational view of the stop bracket shown in FIG. 15;

FIG. 17 is a front elevational view of the stop bracket shown in FIG. 15, FIGS. 16 and 17 being arranged as a projection of FIG. 15.

DETAILED DESCRIPTION OF THE PREFERRED EMBODIMENT

Figure 1:
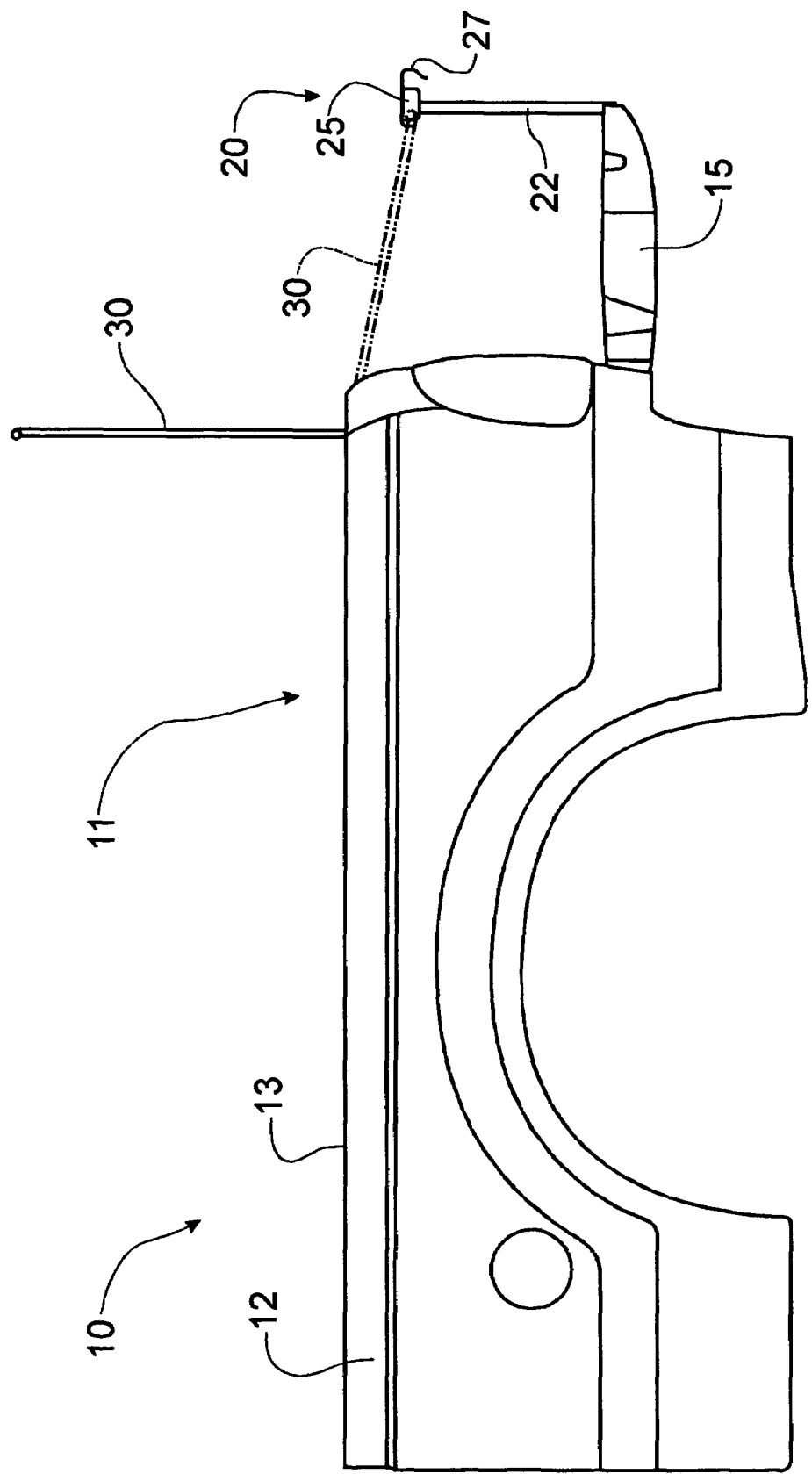
FIG. 1 is a schematic side elevational view of a rear portion of a pick-up truck incorporating a tailgate, with the tailgate shown in a generally horizontal, open position with a supplemental tailgate extended from the tailgate and oriented in a generally vertical position, the lock rods being shown in solid lines extended from the D-pillar of the pick-up truck with the deployed position in engagement with the supplemental tailgate being shown in phantom, in accordance with the principles of the instant invention.
Figure 2:
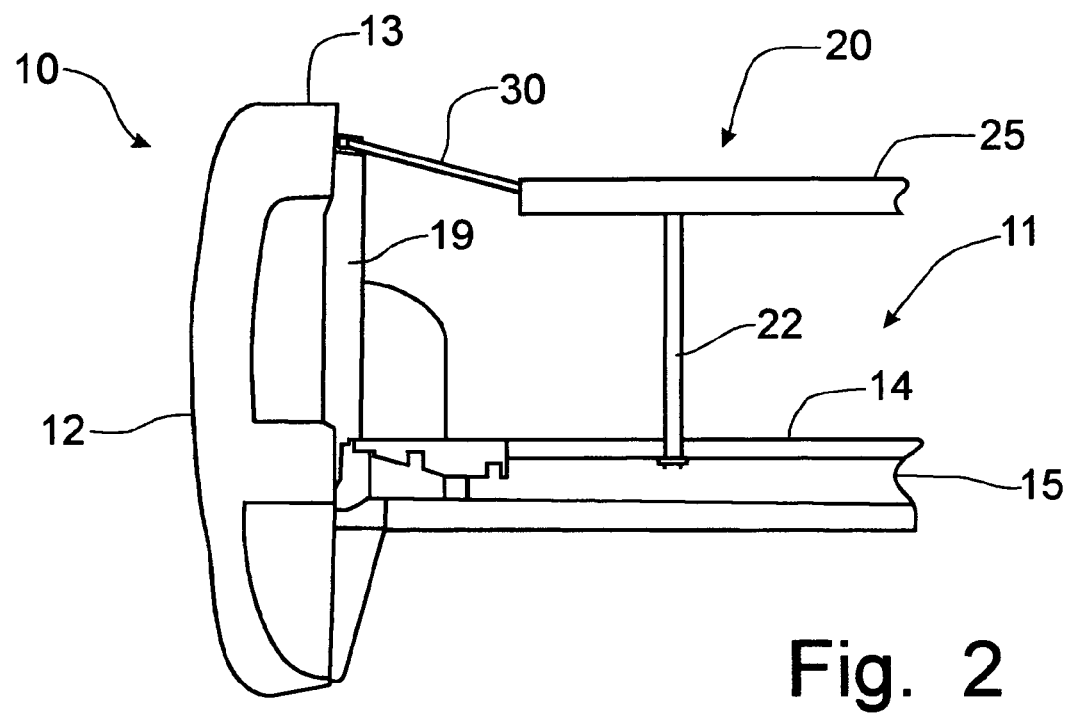
FIG. 2 is a partial schematic rear elevational view, depicting one end of the tailgate and vertically extended supplemental tailgate with the lock rod interconnecting the D-pillar and the end of the supplemental tailgate.
Figure 3:
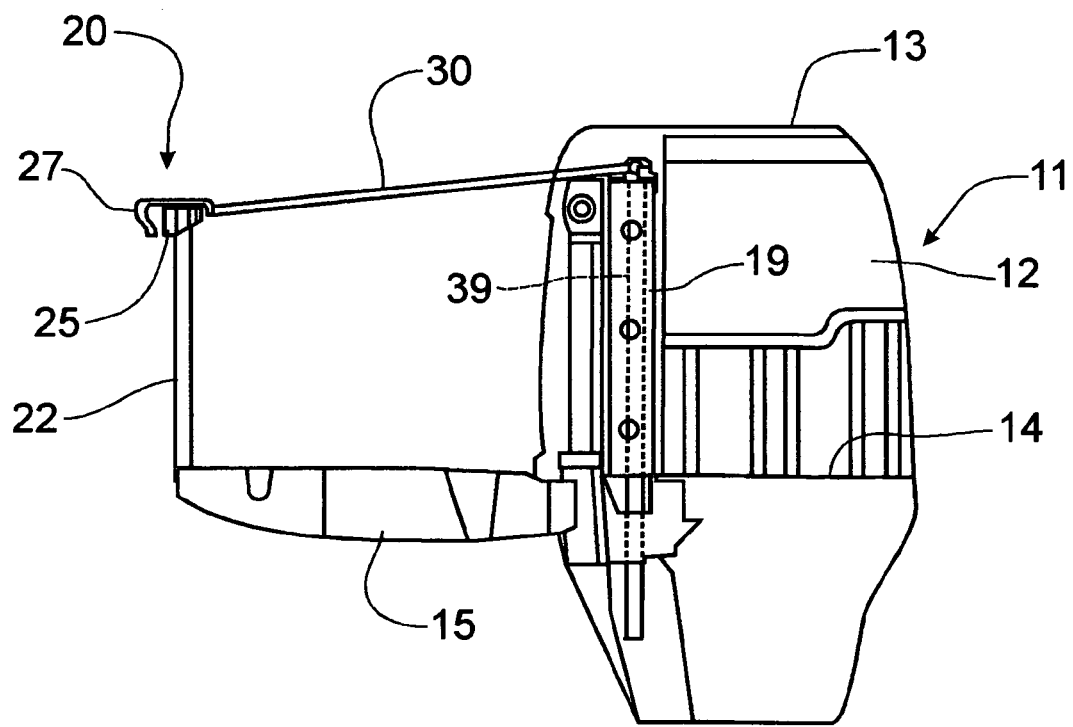
FIG. 3 is a partial schematic cutaway side elevational view taken from the interior of the cargo bed of the pick-up truck through the tailgate and vertically extended supplemental tailgate, with the lock rod member interconnecting the D-pillar and the end of the supplemental tailgate as depicted in FIG. 2.
Figure 6:
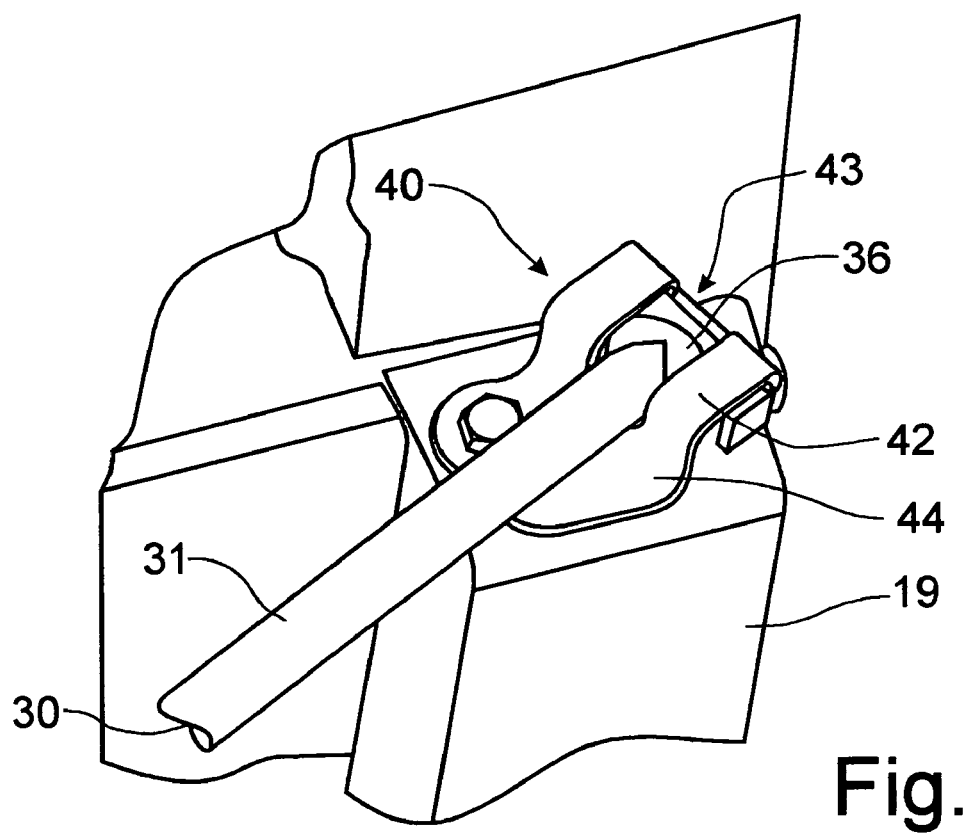
FIG. 6 is an enlarged partial upper, rear perspective view of the D-pillar similar to that of FIG. 4, but with the lock rod deployed from the D-pillar and seated within the stop bracket mounted on top of the D-pillar, the lock rod being broken away for purposes of clarity.
Figure 7:
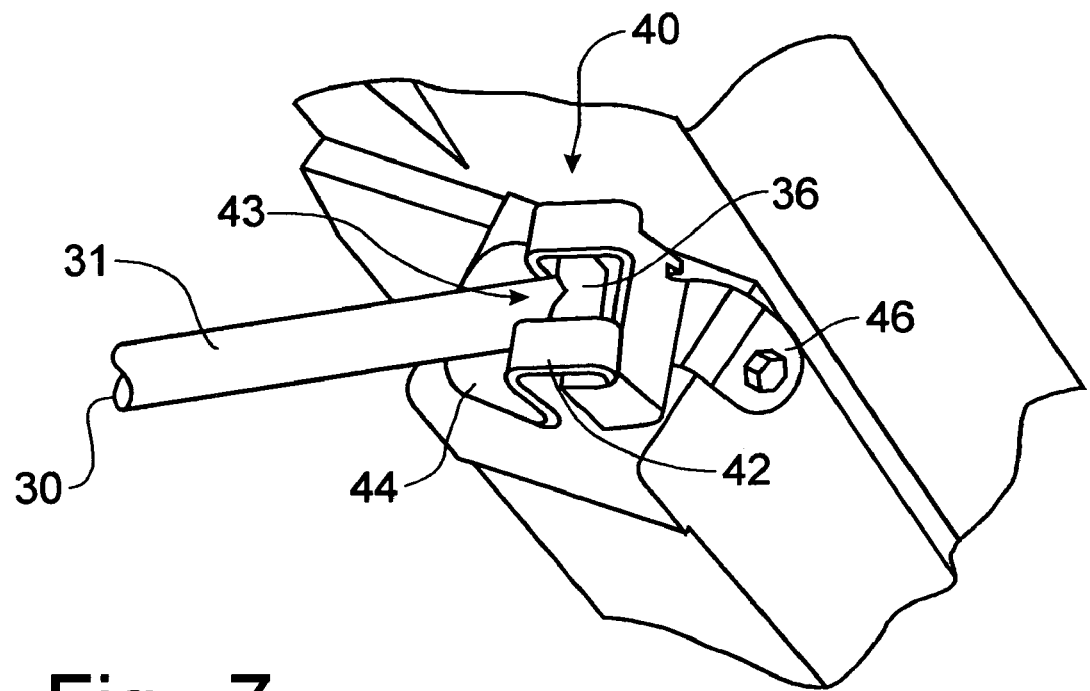
FIG. 7 is an enlarged partial upper front perspective view of the D-pillar similar to that of FIG. 6.
Figure 11:
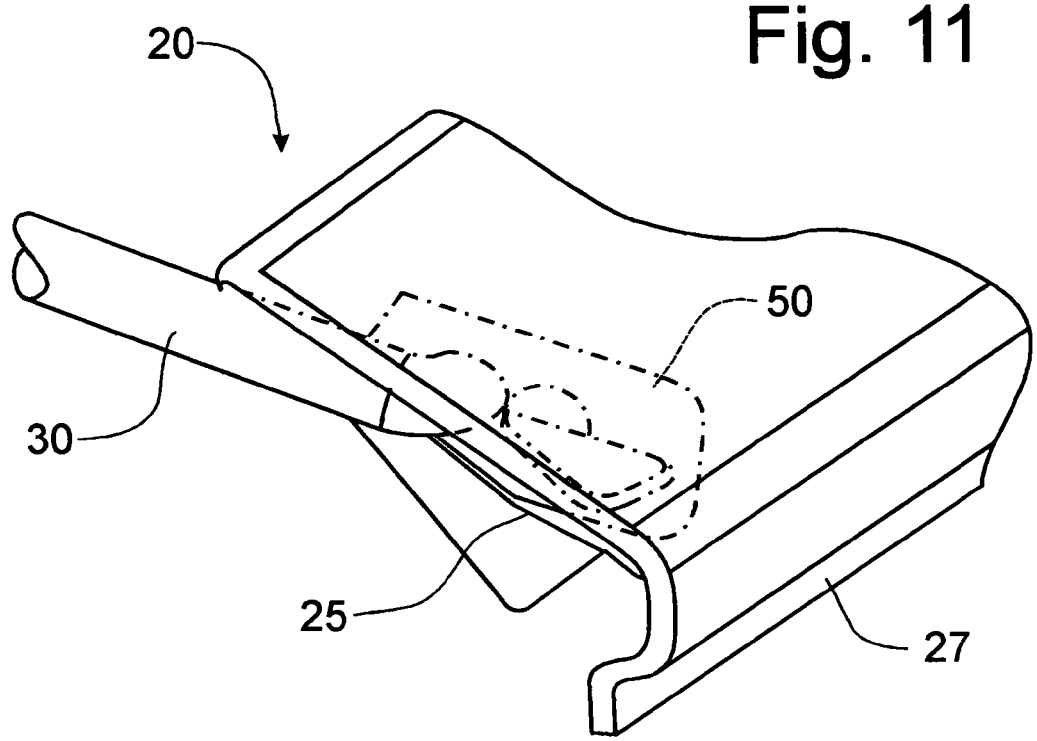
FIG. 11 is a partial perspective view of the end of the supplemental tailgate having a lock rod engaged therewith, the latching mechanism being shown in phantom beneath the pivotable molding.
Figure 12:
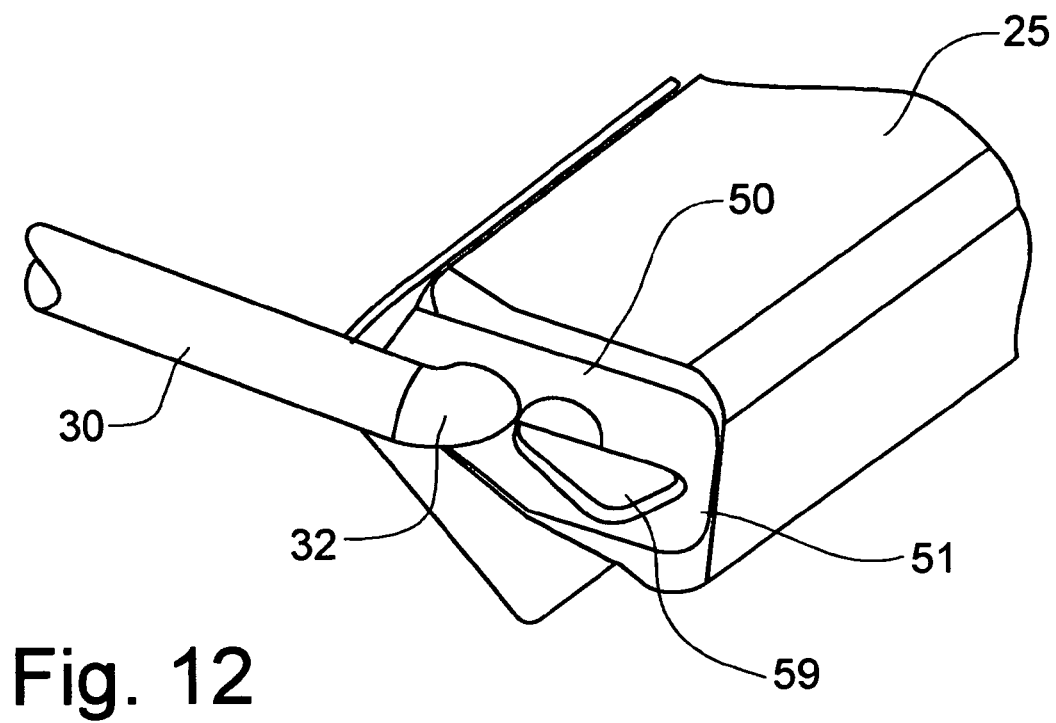
FIG. 12 is a partial perspective view similar to that of FIG. 11, but with the pivotable molding removed to depict the latching mechanism with the lock rod engaged therewith.
Figure 13:
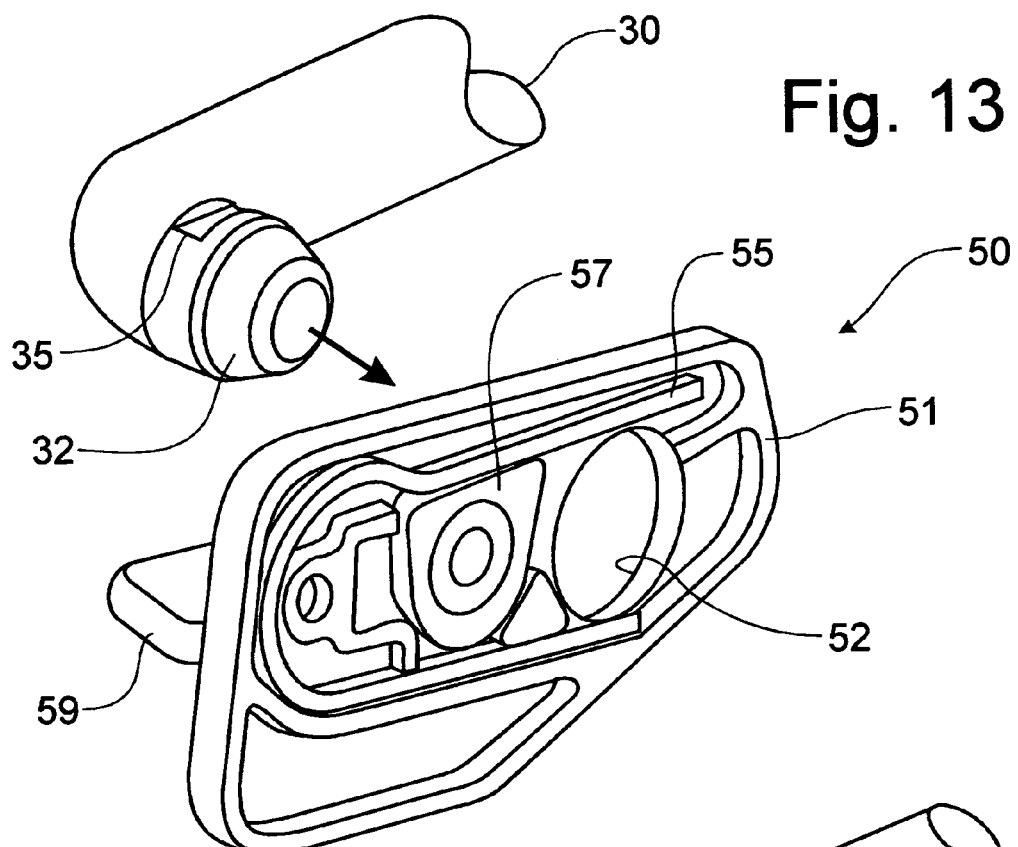
FIG. 13 is a perspective view of the interior of the latching mechanism with the actuation lever depressed to open the spring latch for the release of the insertion end of the lock rod member.
Figure 14:
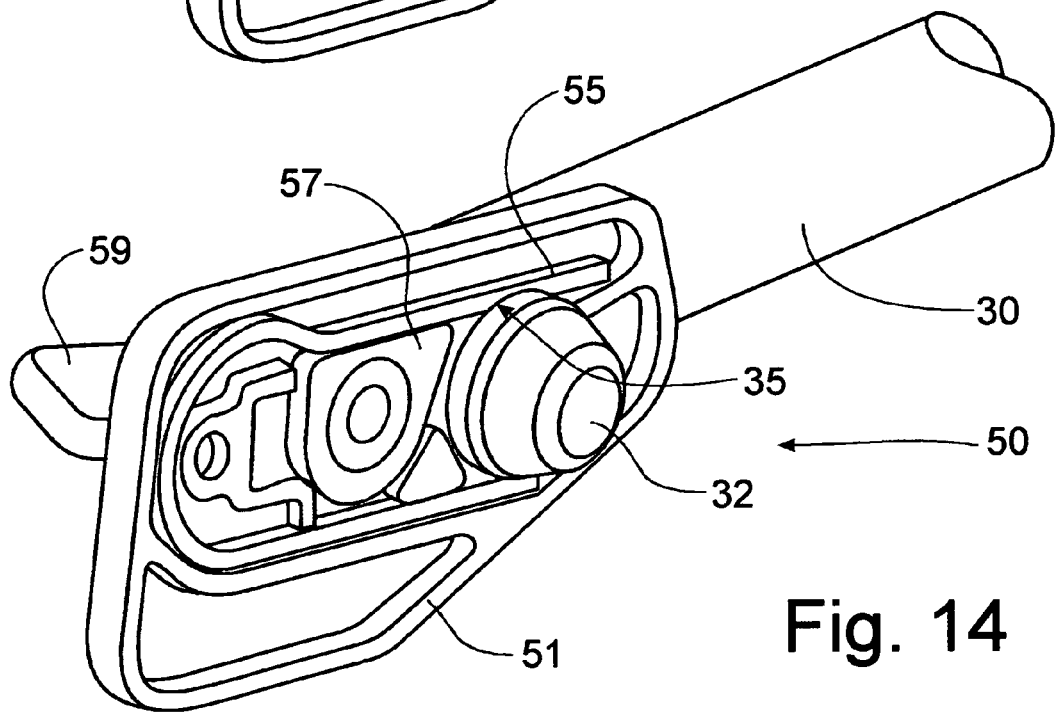
FIG. 14 is a perspective view of the latching mechanism similar to that of FIG. 13, but with the insertion end of the lock rod member engaged with the latch member.

FIGS. 1–17 illustrate a first embodiment of the present invention. The pick-up truck 10 is conventionally manufactured with an open cargo bed 11 at the rear portion of the vehicle 10. The cargo bed 11 is defined by upright side walls 12 and a rear tailgate 15 that is pivotally supported between the side walls 12 for movement between an upright, generally vertical, closed position, and a lowered, generally horizontal, open position, as is depicted in FIG. 1. The cargo bed is also provided with a floor 14 that extends generally horizontally between the side walls 12. When the tailgate 15 is in the lowered, generally horizontal, open position, the top surface of the tailgate 15 is essentially an extension of the floor 14. The cargo bed 11 is also formed with a top rail 13 that is the upper terminus of each of the side walls 12. Generally, the top rail 13 is formed as a generally horizontal extension of the side wall 12 and projects slightly inwardly from the side wall 12. The frame of the pick-up truck 12 includes a pair of opposing upright tubular members 19 that are commonly referred to as the D-pillars, which are located at the rearwardmost part of the cargo bed 11 adjacent the respective side walls 12.

As is disclosed in U.S. Pat. No. 6,966,595, issued on Nov. 22, 2005, the contents of which are incorporated herein by reference, the tailgate 15 can be formed with a supplemental tailgate assembly 20 that is housed in an inoperative position within the hollow interior of the tailgate 15 and can be extended from the supporting structure within the tailgate 15 and, if desired, pivoted into an upright operative position, as is depicted in FIG. 1. The supplemental tailgate assembly 20 is formed with at least one, and preferably two transversely spaced support members 22 that are pivotally supported on the tailgate 15, and a transverse cross member 25 that interconnects the two support members 22. A pivotable molding 27 can be mounted on the cross member 25 and be operatively associated with a latch mechanism (not shown) that fixes the supplemental tailgate assembly 20 within the interior of the tailgate 15 until deployment is desired. Once oriented into the upright operative position with the tailgate in the lowered open position, the supplemental tailgate assembly 20 can serve as a temporary tailgate structure at the end of the main tailgate 15 with the top surface of the main tailgate 15 serving as an extension of the floor 14 of the cargo bed 11.

The supplemental tailgate assembly 20 is not substantially stabile in the upright operative position as only a pivot latch mechanism (not shown) keeps the support member 22 and cross member 25 in the upright orientation. To adequately serve as a temporary tailgate structure at the end of the main tailgate 15, the supplemental tailgate assembly 20 needs to have supports positionally interconnecting the cross member 25 and the side walls 12 of the vehicle 10. In the aforementioned U.S. patent application Ser. No. 10/969,262, lock rods 30 are depicted as being stored on the supplemental tailgate assembly 20 for deployment therefrom to engage the tailgate latch members 16. Once the lock rods 30 are properly deployed, the supplemental tailgate assembly 20 is stabilized. Storage of the lock rods 30 on the structure of the supplemental tailgate assembly 20 requires that adequate room be allotted for the internal storage of the lock rods 30. In one embodiment depicted in the aforementioned '262 patent application, the lock rods are telescopically extendible from the interior of the cross member 25. In other embodiments, depicted in co-pending U.S. patent application Ser. No. 10/969,262, filed on Oct. 20, 2004, the lock rod members 30 can be formed as pivoted rods stored beneath the pivotable molding or as flexible members stored within the cross member 25. Such lock rod embodiments require adequate space be provided on the supplemental tailgate assembly 20 to permit the storage and the deployment of the lock rod members.

As depicted in FIGS. 1–17, the lock rod members 30 can be housed in the D-pillar 19. Preferably, a support tube 39 can be fixed internally within the D-pillar and used to house the lock rod 30 in a stowed position. As is best seen in FIGS.

4, 6, 7 and 15–17, the top of the D-pillar 19 has mounted thereon a stop bracket 40 through which the lock rod 30 extends when being removed from the support tube 39 for deployment in engagement with the supplemental tailgate assembly 20, as is described in greater detail below. The stop bracket 40 is preferably formed with an elevated arch portion 42 that restrains the distal end 36 of the lock rod 30 when the lock rod 30 is fully extended from the D-pillar 19. A first attachment portion 44 will accept a fastener for connection to the top surface of the D-pillar 19, while a second perpendicular attachment portion 46 will accept a fastener for attachment of the stop bracket to the side of the D-pillar 19, as is depicted in FIG. 4. In the alternative, which is particularly suitable for vehicles in which the supplemental tailgate assembly 20 is a standard, built-in feature, the stop bracket 40 could be welded in place.

The lock rod 30 is formed as an elongated rod member 31 having an insertion end 32 and a distal end 36. The insertion end 32 is preferably bent at a right angle to the elongated axis of the rod 31 and formed with a tapered end to facilitate engagement with a latching mechanism 50 affixed to the corresponding end of the cross member 25. A flat slot 35 is preferably formed on the insertion end 32 for engagement with a spring member 55 in the latching mechanism 50, as is described in greater detail below. The distal end 36 is preferably formed with an enlarged bulb 37 that has a larger size than can fit through the opening 43 in the arched portion 42 of the stop bracket 40. Furthermore, the bent insertion end 32 has a dimension greater than the opening 43 in the stop bracket 40 requiring the insertion end 32 to be seated in the arched portion 42 of the stop bracket 40 whenever the lock rod 32 is stowed within the D-pillar 19. Thus, the insertion end 32 of the lock rod 30 can be grasped to pull the elongated rod 31 from the support tube 39 mounted within the D-pillar 19 until the enlarged bulb 37 engages the arched portion 42 of the stop bracket 40, at which point the lock rod 30 will be fully extended and positionable for proper engagement with the latching mechanism 50 on the cross member 25.

The latching mechanism 50 is best seen in FIGS. 11–14 and is formed with a body portion 51 preferably molded from plastic with an opening 52 formed therethrough. A spring member 55 is captured by the body portion 51 and is movable by a cam member 57 pivotally supported on the body portion 51 and connected to an actuation lever 59 movably positioned adjacent the body portion 51. The opening 52 is sized to receive the insertion end 32 of the lock rod 30 when the lock rod has been fully extended from the D-pillar 19. The tapered insertion end 32 is operable to deflect the spring member 55 as the tapered insertion end 32 passes into the opening 52 until the spring member 55 becomes aligned with the flat slot 35, at which point the spring member 55 will drop into the slot 35 and be captured by the insertion end 32. Disengagement of the lock rod 30 from the latching mechanism 50 is accomplished by depressing the actuation lever 59 to disengage the spring member 55 from the flat slot through the operation of the cam member 57, whereupon the insertion end 32 can be withdrawn from the latching mechanism 50.

Thus, in operation, the lock rod 30 can be extended from the support tube 39 as described above until the insertion end 32 is aligned with the latching mechanism 50 on the end of the cross member 25. Snapping the insertion end 32 into the opening 52 within the latching mechanism 50 affixes the lock rod 30 in the proper position for stabilizing the supplemental tailgate assembly 20, as the lock rod 30 is formed at the correct length to extend from the stop bracket 40 to the latching mechanism 50. Disengaging the lock rod 30 requires the actuation lever 59 to be depressed, thereby releasing the latching mechanism 50 from the insertion end 32 of the lock rod 30. The lock rod 30 can then be returned to the support tube 39 within the D-pillar 19 by aligning the elongated rod member 31 with the support tube 39. Storage of the lock rod 30 is attained when the insertion end 32 is received within the opening 43 in the arched portion 42 of the stop bracket 40.

Figure 18:
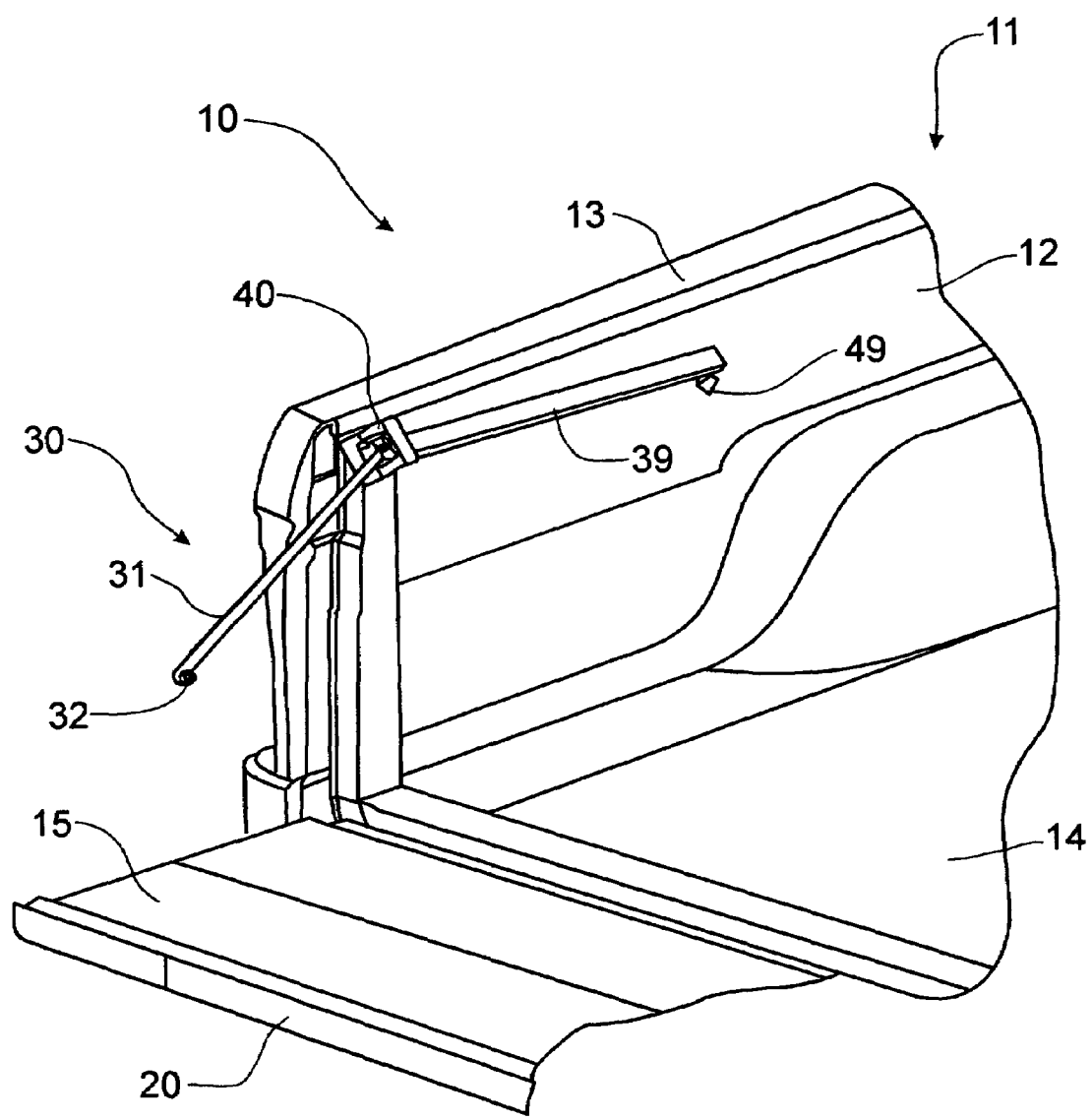
FIG. 18 is partial rear perspective view of the cargo bed of a pick-up truck incorporating a second embodiment of a mounted support tube for stowing a lock rod member for interconnecting the body of the pick-up truck and the end of a supplemental tailgate assembly, the lock rod member being depicted extended from the support tube and positioned for engagement with the supplemental tailgate, which is housed within the tailgate shown in the horizontal open position.

Referring now to FIG. 18, an alternative embodiment of the storage of the lock rod 30 can best be seen. The support tube 39 is mounted generally horizontally with a forward end connected to a support bracket 49 mounted on the side wall 12, or beneath the top rail 13, such that the support tube 39 is positioned out of the way with respect to the use of the bed 11 for hauling cargo. The rearward end of the support tube 39 is preferably supported on top of the D-pillar such that the lock rod 30 when extended therefrom will be in substantially the same orientation as with the embodiment depicted in FIGS. 1–17. With the support tube 39 being disposed almost horizontally, as opposed to be substantially vertically within the interior of the D-pillar 19, the extraction of the lock rod 30 from the support tube 39 does not require adequate vertical clearance, as is depicted in FIG. 1, as the lock rod 30 can be extended substantially horizontally. One skilled in the art will recognize that the support tube 39 is preferably positioned with at least a slight vertical rise from the forward end where the distal end 36 is stowed toward the forward end where the insertion end 32 is stowed, when the lock rod 30 is stowed as depicted in FIG. 18, so that gravity will retain the lock rod 30 within the support tube 39. Alternatively, a movable retainer latch (not shown) engagable with the insertion end 32 when stowed in the support tube 39 could be utilized to retain the stowed lock rod 30 in the support tube 39.

A stop bracket 40 would also be mounted on the support tube 39 in this second embodiment so as to properly position the lock rod for engagement with the latching mechanism 50 on the cross member 25, although the first and second attachment portions may have to be modified for proper engagement with the support tube 39. Preferably, the lock rod 30 would still be formed as described above with respect to the first embodiment, which would preferably be engagable with the latching mechanism 50 as is described in detail above. The primary difference between the first and second embodiments is the orientation of the support tube 39 and the direction in which the lock rod 30 is to be extracted when deployment is desired.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:
1. A pick-up truck comprising:
 a frame including a pair of upright tubular pillars located at transversely spaced positions at the rear of said pick-up truck;
 a cargo bed supported on said frame being defined by a pair of upright side walls and a floor extending generally horizontally between said side walls;

a tailgate pivotally mounted generally between said side walls and movable between an upright, generally vertical closed position and a lowered, generally horizontal open position;

a supplemental tailgate assembly housed within said tailgate and being extendable from said tailgate between a retracted position and an extended position, said supplemental tailgate assembly being pivotable relative to said tailgate between a position generally parallel to said tailgate and a position generally perpendicular to said tailgate, such that said supplemental tailgate assembly can be operated as a temporary tailgate in a generally vertical orientation when said tailgate is in said open position; and a lock rod assembly mounted in said upright tubular pillars, said lock rod assembly including a pair of lock rods being movable between a stowed position and an extended position in which said lock rods can be connected to said supplemental tailgate assembly when being operated as a temporary tailgate.

2. The pick-up truck of claim 1 wherein said lock rod assembly includes a support tube mounted internally of each said upright tubular pillar, said lock rods being housed in said support tubes when in said stowed position and extendable from said upright tubular pillars when moved into engagement with said supplemental tailgate assembly.

3. The pick-up truck of claim 2 wherein said lock rods are formed as elongated rod members having an insertion end and an enlarged distal end, said lock rod assembly further including a stop bracket mounted on top of each upright tubular pillar to restrain said enlarged distal end when said lock rod is in said extended position.

4. The pick-up truck of claim 3 wherein said insertion end extends generally perpendicularly to said elongated rod member and engages a latching mechanism mounted on said supplemental tailgate assembly.

5. The pick-up truck of claim 4 wherein said insertion end includes a slot formed therein, said latching mechanism includes an opening for receiving said insertion end and a spring member that engages said slot to retain said insertion end in engagement with said latching mechanism, said spring member being operably connected to an actuation lever to affect a disengagement of said spring member from said slot when disengagement of said lock rod from said supplemental tailgate assembly is desired.

6. The pick-up truck of claim 5 wherein said supplemental tailgate assembly includes at least one upright support member pivotally connected to said tailgate and a cross member extending transversely and supported above said tailgate by said at least one support member when being operated as a temporary tailgate, said latching mechanism being mounted on opposing transverse ends of said cross member.

7. A pick-up truck comprising:

a frame including a pair of upright tubular pillars located at transversely spaced positions at the rear of said pick-up truck;

a cargo bed supported on said frame being defined by a pair of upright side walls and a floor extending generally horizontally between said side walls, said side walls terminating in top rails spaced above said floor;

a tailgate pivotally mounted generally between said side walls and movable between an upright, generally vertical closed position and a lowered, generally horizontal open position;

a supplemental tailgate assembly housed within said tailgate and being extendable from said tailgate between a retracted position and an extended position, said supplemental tailgate assembly being pivotable relative to said tailgate between a position generally parallel to said tailgate and a position generally perpendicular to said tailgate, such that said supplemental tailgate assembly can be operated as a temporary tailgate in a generally vertical orientation when said tailgate is in said open position; and a lock rod assembly mounted in generally horizontally oriented support tubes positioned at least partially beneath said top rails, said lock rod assembly including a pair of lock rods being movable from a stowed position within said support tubes so as to be horizontally extended therefrom into an extended position in which said lock rods can be connected to said supplemental tailgate assembly when being operated as a temporary tailgate.

8. The pick-up truck of claim 7 wherein each said support tube is connected to the corresponding said side wall by a connecting bracket and mounted on top of said upright tubular pillar.

9. A lock rod assembly for use in positionally stabilizing a supplemental tailgate assembly being operated as a temporary tailgate oriented generally vertically at a rearward end of a tailgate lowered into an open position for extending a cargo bed forming part of an automotive vehicle, comprising:

a support tube mounted on said cargo bed;

a lock rod mounted in said support tube and being extendable therefrom into an extended position, from a stowed position within said support tube, for engagement with said supplemental tailgate assembly, said lock rod interconnecting said cargo bed and said supplemental tailgate assembly for positionally stabilizing said supplemental tailgate assembly for use as a temporary tailgate.

10. The lock rod assembly of claim 9 wherein said lock rod includes an elongated rod member having an insertion end engagable with said supplemental tailgate assembly and an enlarged distal end retained in engagement with said support tube.

11. The lock rod assembly of claim 10 wherein said support tube has a stop bracket mounted at an end thereof to retain said enlarged distal end of said lock rod.

12. The lock rod assembly of claim 11 wherein said stop bracket includes an arched portion having an opening therein for the passage of said elongated rod member, said arched portion receiving said insertion end when said lock rod is in said stowed position and for retaining said enlarged distal end when said lock rod is in said extended position.

13. The lock rod assembly of claim 11 wherein said support tube is mounted internally of an upright tubular pillar at a rearward end of said cargo bed, said stop bracket being mounted on a top portion of said pillar.

14. The lock rod assembly of claim 13 wherein said insertion end includes a slot formed therein, said supplemental tailgate assembly including a latching mechanism engagable with said insertion end, said latching mechanism having an opening for receiving said insertion end and a spring member that engages said slot to retain said insertion end in engagement with said latching mechanism, said spring member being operably connected to an actuation lever to affect a disengagement of said spring member from said slot when disengagement of said lock rod from said supplemental tailgate assembly is desired.

15. The lock rod assembly of claim 12 wherein said cargo bed includes side walls terminating in top rails, said support tube being mounted generally horizontally, at least partially beneath said top rails so that said lock rods can be horizontally extended therefrom into said extended position, said support tube being connected to said side wall by a connecting bracket and mounted on top of upright tubular pillar at a rearward end of said cargo bed.

16. In a vehicle having a frame including a pair of transversely spaced upright tubular pillar located at a rearward portion of said vehicle, a cargo bed supported on said frame and being defined by opposing upright side walls and a generally horizontal floor extending between said side walls; a tailgate pivotally mounted between said sidewalls for movement between an upright closed position and a lowered open position; and a supplemental tailgate assembly housed within said tailgate to be extendable therefrom, said supplemental tailgate assembly being pivotally movable into a generally vertical position when said tailgate is in said lowered open position to serve as a temporary tailgate, the improvement comprising:

a lock rod assembly extendable from a top portion of each said pillar to be engagable with said supplemental tailgate for stabilization thereof when being operated as said temporary tailgate, each said lock rod assembly including a support tube and a lock rod housed within said support tube in a stowed position and being extendable therefrom into an extended position for engagement with said supplemental tailgate assembly, each said lock rod being formed as an elongated rod member having an insertion end engagable with said supplemental tailgate assembly and an enlarged distal end.

17. The vehicle of claim 16 wherein each said support tube is mounted internally of a corresponding said pillar, a stop bracket being mounted on said top portion of each respective said pillar retains said enlarged end of said lock rod while in said extended position.

18. The vehicle of claim 17 wherein each said insertion end includes a slot formed therein, said supplemental tailgate assembly including a latching mechanism engagable with each said insertion end, said latching mechanism having an opening for receiving said insertion end and a spring member that engages said slot to retain said insertion end in engagement with said latching mechanism, said spring member being operably connected to an actuation lever to affect a disengagement of said spring member from said slot when disengagement of said lock rod from said supplemental tailgate assembly is desired.

19. The vehicle of claim 16 wherein each said support tube is connected to the corresponding said side wall by a connecting bracket and mounted on said top portion of the respective said pillar, a stop bracket being mounted on said top portion of each respective said pillar retains said enlarged end of said lock rod while in said extended position.

* * * * *

UNITED STATES PATENT AND TRADEMARK OFFICE
CERTIFICATE OF CORRECTION

| | |
|---|---|
| PATENT NO. | : 7,229,116 B1 |
| APPLICATION NO. | : 11/235914 |
| DATED | : June 12, 2007 |
| INVENTOR(S) | : Steve Bruford et al. |

It is certified that error appears in the above-identified patent and that said Letters Patent is hereby corrected as shown below:

On Title Page

Item 73
The Assignees are:

Ford Global Technologies, LLC　　　Dearborn, MI

Multimatic, Inc.　　　Markham, Ontario, Canada

Signed and Sealed this

Twenty-seventh Day of November, 2007

JON W. DUDAS
*Director of the United States Patent and Trademark Office*